United States Patent
Tonnon et al.

(10) Patent No.: US 10,580,088 B2
(45) Date of Patent: Mar. 3, 2020

(54) VEHICLE TRAVEL MONITORING AND PAYMENT SYSTEMS AND METHODS

(75) Inventors: Garry Tonnon, Ramsey, NJ (US); David A. Owen, Castle Rock, CO (US)

(73) Assignee: The Western Union Company, Denver, CO (US)

(*) Notice: Subject to any disclaimer, the term of this patent is extended or adjusted under 35 U.S.C. 154(b) by 803 days.

(21) Appl. No.: 12/716,791

(22) Filed: Mar. 3, 2010

(65) Prior Publication Data

US 2011/0218896 A1 Sep. 8, 2011

(51) Int. Cl.
G06Q 40/00 (2012.01)
G06Q 20/14 (2012.01)
G06Q 20/08 (2012.01)
G06Q 20/16 (2012.01)
G06Q 20/02 (2012.01)

(52) U.S. Cl.
CPC ......... *G06Q 40/123* (2013.12); *G06Q 20/027* (2013.01); *G06Q 20/085* (2013.01); *G06Q 20/145* (2013.01); *G06Q 20/16* (2013.01)

(58) Field of Classification Search
USPC ......................................................... 705/19
See application file for complete search history.

(56) References Cited

U.S. PATENT DOCUMENTS

| 4,189,708 A | 2/1980 | Bryll | |
|---|---|---|---|
| 5,574,424 A | 11/1996 | Nguyen | |
| 5,644,724 A * | 7/1997 | Cretzler | 705/19 |
| 5,694,322 A * | 12/1997 | Westerlage et al. | 705/417 |
| 5,729,458 A * | 3/1998 | Poppen | 705/400 |
| 5,774,872 A * | 6/1998 | Golden et al. | 705/19 |
| 5,787,373 A * | 7/1998 | Migues et al. | 701/527 |
| 5,799,283 A * | 8/1998 | Francisco et al. | 705/19 |
| 5,819,234 A * | 10/1998 | Slavin et al. | 340/10.4 |
| 5,819,249 A * | 10/1998 | Dohanich et al. | 706/46 |
| 5,864,831 A * | 1/1999 | Schuessler | 705/417 |
| 5,875,433 A * | 2/1999 | Francisco et al. | 705/19 |
| 5,970,481 A * | 10/1999 | Westerlage et al. | 705/417 |
| 6,151,549 A * | 11/2000 | Andrews et al. | 701/115 |

(Continued)

FOREIGN PATENT DOCUMENTS

EP 1320075 A2 * 6/2003 ............ G07B 15/00

OTHER PUBLICATIONS

Donath M. et al. (Jun. 2009). Technology Enabling Near-Term Nationwide Implementation of Distance Based Road User Fees. Intelligent Transportation Systems Institute, Univ. of Minnesota (hereinafter "Donath").*

(Continued)

*Primary Examiner* — Peter Ludwig
(74) *Attorney, Agent, or Firm* — Kilpatrick Townsend & Stockton LLP

(57) ABSTRACT

The invention provides various methods and systems for collecting and allocating road use fees. The invention may include receiving funds from a party, wherein the party is responsible for operation of a vehicle. Data indicating where the vehicle has traveled may be received by a computer system. A jurisdiction may be identified where road use fees are due based on where the vehicle has traveled. Fees due to the jurisdiction may be calculated based on the jurisdiction's road use fee schedule. The fee due for road use may be deducted from an account of the vehicle's operator.

18 Claims, 6 Drawing Sheets

(56) References Cited

U.S. PATENT DOCUMENTS

| | | | |
|---|---|---|---|
| 6,169,552 B1* | 1/2001 | Endo et al. | 345/427 |
| 6,181,995 B1* | 1/2001 | Luper et al. | 701/521 |
| 6,314,401 B1 | 11/2001 | Abbe et al. | |
| 6,526,335 B1 | 2/2003 | Treyz et al. | |
| 6,574,603 B1 | 6/2003 | Dickson et al. | |
| 6,606,543 B1 | 8/2003 | Sproule et al. | |
| 6,711,474 B1* | 3/2004 | Treyz et al. | 701/1 |
| 6,816,707 B1 | 11/2004 | Barker et al. | |
| 7,014,106 B2* | 3/2006 | Nakajima | 235/379 |
| 7,110,570 B1 | 9/2006 | Berenz et al. | |
| 7,158,876 B2* | 1/2007 | Crook | 701/533 |
| 7,734,500 B1* | 6/2010 | Allen et al. | 705/13 |
| 7,778,894 B2* | 8/2010 | Monsor et al. | 705/31 |
| 7,818,204 B2* | 10/2010 | Solomon | 705/13 |
| 7,908,149 B2* | 3/2011 | Dar et al. | 705/1.1 |
| 7,970,644 B2* | 6/2011 | Hedley et al. | 705/13 |
| 8,214,269 B2* | 7/2012 | Wilmes et al. | 705/13 |
| 8,306,881 B2* | 11/2012 | Von Drehnen et al. | 705/31 |
| 8,321,265 B2* | 11/2012 | Aschenbrenner et al. | 705/13 |
| 8,407,144 B2 | 3/2013 | Roberts et al. | |
| 2001/0055165 A1 | 12/2001 | McCarthy et al. | |
| 2002/0052792 A1* | 5/2002 | Johnson et al. | 705/19 |
| 2002/0169641 A1* | 11/2002 | Wallace, Jr. | 705/4 |
| 2003/0020634 A1* | 1/2003 | Banerjee et al. | 340/928 |
| 2003/0069784 A1 | 4/2003 | Banerjee et al. | |
| 2003/0130774 A1* | 7/2003 | Tripathi et al. | 701/33 |
| 2004/0067752 A1 | 4/2004 | Himmelstein | |
| 2004/0110472 A1 | 6/2004 | Witkowski et al. | |
| 2005/0012599 A1 | 1/2005 | DeMatteo | |
| 2005/0046584 A1 | 3/2005 | Breed | |
| 2005/0090279 A9 | 4/2005 | Witkowski et al. | |
| 2005/0099320 A1 | 5/2005 | Nath et al. | |
| 2005/0131607 A1 | 6/2005 | Breed | |
| 2005/0156714 A1 | 7/2005 | McCarthy et al. | |
| 2005/0195783 A1 | 9/2005 | Basir | |
| 2005/0226472 A1 | 10/2005 | Komura | |
| 2006/0215884 A1 | 9/2006 | Ota | |
| 2007/0136083 A1 | 6/2007 | Simon et al. | |
| 2007/0265744 A1* | 11/2007 | Nicolai | 701/35 |
| 2008/0069403 A1 | 3/2008 | Breed | |
| 2008/0208680 A1 | 8/2008 | Cho | |
| 2008/0208701 A1 | 8/2008 | Betancourt et al. | |
| 2009/0024458 A1* | 1/2009 | Palmer | 705/13 |
| 2009/0024525 A1 | 1/2009 | Blumer et al. | |
| 2009/0248538 A1 | 10/2009 | Taylor | |
| 2009/0248577 A1* | 10/2009 | Hoj | 705/40 |
| 2009/0289780 A1 | 11/2009 | Tenorio-Fox | |
| 2010/0057624 A1 | 3/2010 | Hurt et al. | |
| 2010/0076878 A1* | 3/2010 | Burr et al. | 705/34 |
| 2010/0082230 A1 | 4/2010 | Hong et al. | |
| 2010/0088127 A1 | 4/2010 | Betancourt et al. | |
| 2010/0207754 A1 | 8/2010 | Shostak et al. | |
| 2010/0228608 A1* | 9/2010 | Hedley et al. | 705/13 |
| 2010/0253504 A1 | 10/2010 | Lliteras et al. | |
| 2010/0274570 A1 | 10/2010 | Proefke et al. | |
| 2010/0280956 A1 | 11/2010 | Chutorash et al. | |
| 2011/0035294 A1 | 2/2011 | Mizrah | |
| 2011/0137773 A1* | 6/2011 | Davis et al. | 705/34 |
| 2011/0218896 A1 | 9/2011 | Tonnon et al. | |
| 2011/0231310 A1 | 9/2011 | Roberts et al. | |

OTHER PUBLICATIONS

U.S. Appl. No. 12/727,079, filed Mar. 18, 2010 Non-Final Rejection dated Mar. 9, 2012, all pages.

U.S. Appl. No. 12/727,079, filed Mar. 18, 2010 Final Rejection dated Jul. 24, 2012, all pages.

U.S. Appl. No. 12/727,079, filed Mar. 18, 2010 Notice of Allowance dated Dec. 26, 2012, all pages.

* cited by examiner

|   | Vehicle Type | Number of Axles | Amt. of Miles | Amt./Mile |
|---|---|---|---|---|
| 225 | Personal | 2 | <1000 | 0 |
| 230 | Personal | 2 | ≥1000 | 0.05 |
|   | Commercial | 2 | <100 | 0.01 |
|   | Commercial | 2 | ≥100 | 0.03 |
|   | Commercial | 5 | <100 | 0.02 |
|   | Commercial | 5 | ≥100 | 0.06 |

FIG. 2

VEHICLE TRAVEL MONITORING AND PAYMENT SYSTEMS AND METHODS

BACKGROUND OF THE INVENTION

Currently, various government agencies collect taxes through the sale of fuel, such as gasoline. The federal government may tax fuel by a certain amount (such as 24.4 cents per gallon), and a state where the fuel is sold may tax an additional amount. The amount taxed by different states may vary significantly: as high as 64.5 cents per gallon in California, and as low as 18.4 cents per gallon in Alaska.

The more a vehicle is driven, the more fuel the vehicle will consume. Greater fuel consumption leads to more fuel needing to be purchased. With greater fuel purchases, the greater the taxes paid to the taxing government agencies. Therefore, the more a vehicle is driven, the greater the fuel taxes that will be paid to a state (or other taxing agency) through purchase of fuel. States may rely on these taxes to fund at least a portion of their transportation budgets, including road and bridge building and maintenance, snow removal, etc. However, such a taxing arrangement may only successfully link fuel taxes paid for an amount of road usage if: 1) the fuel purchased is taxed, and 2) the fuel is taxed by the jurisdiction where the vehicle will travel.

While in the past it may have been typical that fuel was purchased for vehicles from an entity such as a gas station (that collects fuel taxes), the future may yield vehicles that are fueled using alternative sources. For example, vehicles are now under development that rely solely on electrical power—no gasoline being necessary. It may be possible for such electric cars to be "fueled" from a typical electrical source, such as a household electrical outlet. Using an electrical source to power vehicles may provide significant advantages in emissions and operator convenience (e.g., "fueling" at home); however such fueling arrangements may disrupt federal, state, and local fuel taxing structures. If fuel is not purchased from an entity that collects fuel taxes, federal, state, and local revenue borne from fuel taxes may wither. Further, it may not be practical for taxing jurisdictions to attempt to determine the amount of electricity used to "fuel" a vehicle separately from electricity used to power other devices.

Whether electric vehicles become common or not, it may be possible to evade jurisdictions' fuel taxes by purchasing fuel in a different jurisdiction. If fuel taxes are lower in a nearby state, a vehicle operator may travel from his current state to the nearby state to purchase fuel, without regard to where the vehicle's travel will occur. For example, a person driving in northern California (64.5 cent per gallon fuel tax) may drive a short distance to southern Oregon (43.4 cents per gallon fuel tax) to purchase fuel, despite the person's majority of driving occurring in California. Such an arrangement, deprives California of fuel taxes despite the person traveling California's roads, and awards the fuel taxes to a state whose roads will be largely unused by the person.

The described invention may serve to remedy these and other problems.

BRIEF SUMMARY OF THE INVENTION

The invention provides for various ways to tax vehicles' operators for travel within a jurisdiction through methods other than fuel taxes. The invention allows for a vehicle operator to fund a prepaid stored value account before travel or for the vehicle operator to post-pay for travel after receiving a bill. As the operator's vehicle travels through a jurisdiction, the vehicle's travel is monitored. The vehicle may transmit travel information to a central computer system. Based upon the various taxing schedules of jurisdictions, the stored value account of the vehicle's operator may be debited or the vehicle's operator may be billed for an amount due to each jurisdiction for travel.

In some embodiments of the invention, a method for collecting and allocating road use fees is described. The method may include receiving, at a payment computer system, funds from a party, wherein the party is responsible for operation of a vehicle. The method may include receiving, at the payment computer system, a stored value account identifier from the party. The method may also include allocating, by the payment computer system, at least a portion of the received funds to the stored value account linked to the stored value account identifier. The method may further include receiving, at the payment computer system, data indicating where the vehicle has traveled. The method may include determining, by the payment computer system, a jurisdiction where road use fees are due based on where the vehicle has traveled. The method may further include calculating, by the payment computer system, fees due to the jurisdiction based on the jurisdiction's road use fee schedule. The method may include deducting, by the payment computer system, at least the fee due for road use from the stored value account. Also, the method may include transferring, by the payment computer system, the fee to the jurisdiction.

In some embodiments of the invention, a method of road tax collection is described. The method may include providing, a payment computer system, wherein the payment computer system is comprised of a computer-readable storage device and a processor. The method may also include receiving, at the payment computer system, a first set of data indicating that a vehicle has traveled in a first jurisdiction. The method may further include receiving, at the payment computer system, a second set of data indicating that the vehicle has traveled in a second jurisdiction. The method may include calculating, by the payment computer system, at least partially based on a first fee schedule of the first jurisdiction, road tax fees due to the first jurisdiction for the vehicle's travel. The method may include calculating, by the payment computer system, at least partially based on a second fee schedule of the second jurisdiction, road tax fees due to the second jurisdiction for the vehicle's travel, wherein the first fee schedule and the second fee schedule are different. The method may also include notifying, by the payment computer system, a party that road tax fees are due for the vehicle's travel in the first jurisdiction and the second jurisdiction. The method may include receiving, at the payment computer system, a road tax fee payment from the party for the road tax fees due to the first and second jurisdictions. The method may further include distributing, by the payment computer system, a first portion of the road tax fee payment to the first jurisdiction. The method may also include distributing, by the payment computer system, a second portion of the road tax fee payment to the second jurisdiction.

The invention may include a computer-readable storage medium having a computer-readable program embodied therein for directing operation of a host computer including a communication system, a processor, and a storage device, wherein the computer-readable program comprises instructions for operating the host computer to process road tax fee collection transactions. The instructions may include receiving a first set of global navigation satellite data indicating that a vehicle has traveled in a first jurisdiction. The instructions may include receiving a second set of global navigation satellite data indicating that the vehicle has traveled in a second jurisdiction. The instructions may include calculating, at least partially based on the first set of global navigation satellite data and a first fee schedule of the first jurisdiction, road tax fees due to the first jurisdiction for the vehicle's travel. The instructions may also include calculating, at least partially based on the second set of global navigation satellite data and a second fee schedule of the second jurisdiction, road tax fees due to the second jurisdiction for the vehicle's travel, wherein the first fee schedule and the second fee schedule are different. The instructions may also include notifying a party that road tax fees are due for the vehicle's travel in the first jurisdiction. The instructions may further include notifying a party that road tax fees are due for the vehicle's travel in the second jurisdiction. The method may also include receiving a road tax fee payment from the party for the road tax fees due to the first and second jurisdictions. The instructions also may include distributing a first portion of the road tax fee payment to the first jurisdiction. Further, the instructions may include distributing a second portion of the road tax fee payment to the second jurisdiction.

BRIEF DESCRIPTION OF THE DRAWINGS

A further understanding of the nature and advantages of the present invention may be realized by reference to the following drawings. In the appended figures, similar components or features may have the same reference label.

FIG. 2 is a simplified embodiment of a jurisdiction payment schedule.

DETAILED DESCRIPTION OF THE INVENTION

Figure 1:
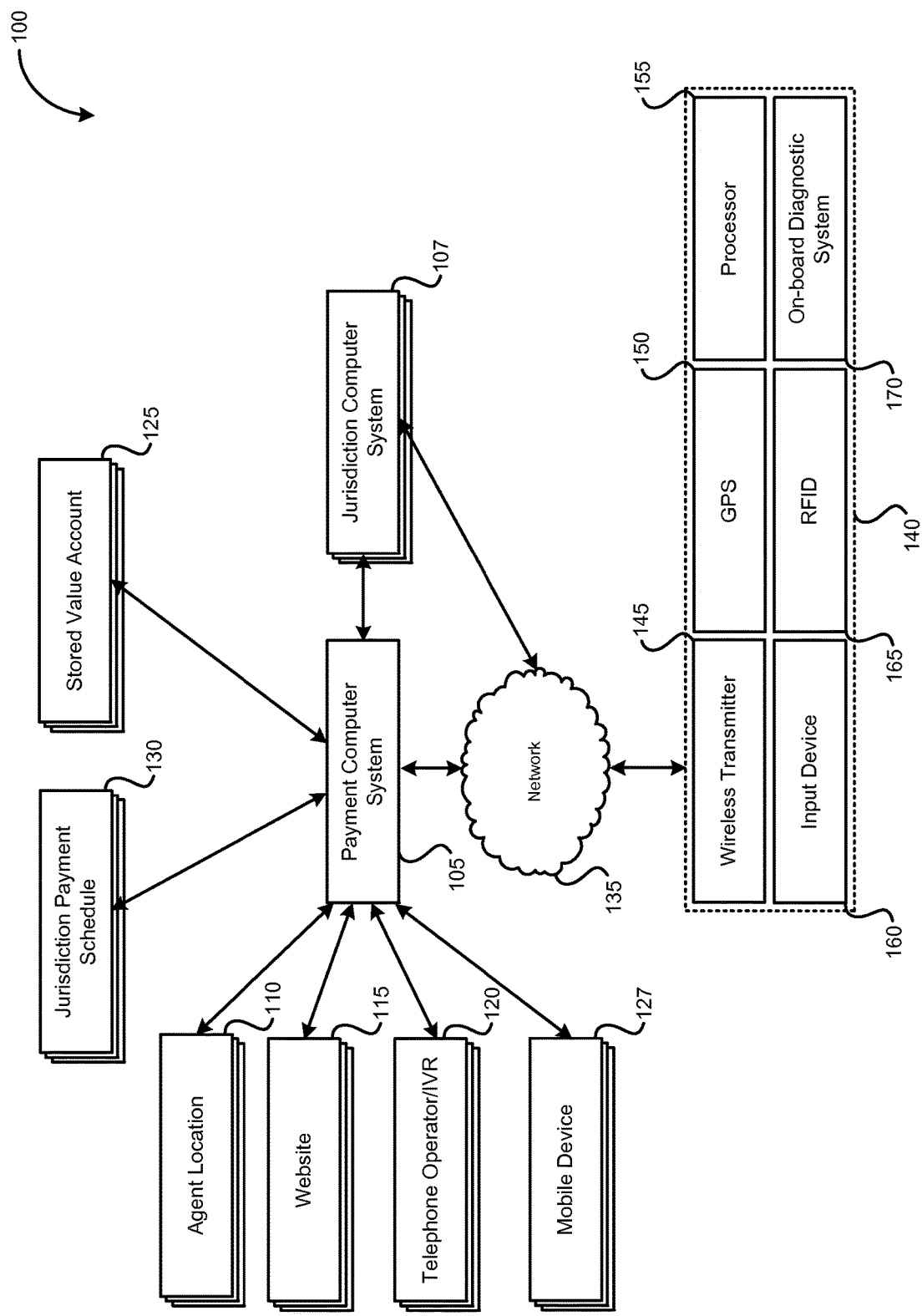
FIG. 1 is a simplified block diagram of a vehicle usage tax collection system.

Currently, fuel taxes may be used to fund a state or other jurisdiction's transportation budget. Such taxes may be used to repair and replace roads, conduct snow removal, conduct traffic enforcement, etc. A state (or other jurisdiction) may wish to modify its collection of fuel taxes in order to account for an increasing number of vehicle that do not use fuel obtained through traditional entities (e.g., gas stations) or for vehicle operators who purchase fuel in jurisdictions other than where their vehicles predominantly travel.

As opposed to collecting taxes at a point-of-sale through fuel purchases, locations of a vehicle's use may be monitored, with taxes being directly tied to where the vehicle has traveled. Such a tax may be referred to as a "usage tax." For example, a vehicle may be monitored to determine when it moves from one jurisdiction to another such as by using radio frequency identification tags or cameras. Also, a vehicle may periodically transmit its location. Such a vehicle may be equipped with a global navigation satellite system device, such as a global positioning system device (other systems involving cellular communications, RFIDs, etc may also be possible). A payment system responsible for collecting and paying taxes to the various jurisdictions where travel has occurred may receive and process information regarding a vehicle's travels.

Such a payment system may be flexible. It may allow for pre-payment of usage taxes. For example, a vehicle operator may deposit money into a stored value account linked to the operator and/or the vehicle. The stored value account may be held by the entity maintaining the payment system. Periodically, amounts of money may be withdrawn from this account by the payment system in order to pay a jurisdiction for travel occurring within its limits. The payment system may also allow for post-payment. Such a post-payment scheme may involve one or more jurisdictions reporting to the payment system an amount of money due to the jurisdiction. The payment system may then bill the vehicle's operator. The vehicle's operator, who may be the vehicle's driver, owner, and/or a corporate entity, may remit payment to the payment system. The payment system may divide the payment into various fractions, with portions of the payment being remitted to different jurisdictions. Alternatively, the payment may be remitted through various agent locations. At an agent location, the vehicle's operator may make a payment in person through a payment method such as cash. For example, payment system may be maintained by an entity such as WESTERN UNION, with affiliates and/or storefronts of WESTERN UNION serving as the agent locations.

Such systems and methods may allow for flexibility and efficient collection of taxes for the precise amount of road use within a jurisdiction. By monitoring a vehicle's movement within a jurisdiction, the vehicle's operator may be charged for the tax linked to an amount of distance the vehicle has traveled within the jurisdiction, an amount of time the vehicle has spent within the jurisdiction, and/or specific locations or roadways that the vehicle used within the jurisdiction that requires payment of usage taxes. Further, the use of such systems and methods allows for the vehicle to be taxed regardless of what type of fuel the vehicle uses.

FIG. 1 illustrates a simplified block diagram of a vehicle usage tax collection system 100. Such a vehicle usage tax collection system 100 may collect usage tax information for many vehicles and/or operators. To maintain simplicity, only one vehicle, vehicle 140, is represented in FIG. 1. Vehicle 140 may contain various subsystems such as a wireless transmitter 145, a GPS device 150, a processor 155, input device 160, an RFID device 165, and/or a onboard diagnostic system 170. RFID device 165 may be used to identify the vehicle 140. The GPS device 150 may be used to determine the location of the vehicle 140 and to broadcast and/or compile data on where the vehicle is located and/or where the vehicle 140 has traveled. While FIG. 1 illustrates a GPS system device 150, as those with skill in the art will recognize any form of global navigation satellite system may be used to locate the vehicle 140. The vehicle 140 may also include input device 160. Such an input device 160 may allow for the driver to identify who he is. This may be important, for example, when multiple drivers use the same vehicle. Allowing a driver to input who is operating the vehicle may allow drivers to pay usage fees associated with only travel they have performed, rather than travel that has been performed with the vehicle. A wireless transmitter 145 may allow for various information to be transmitted to and from vehicle 140. Vehicle 140 may transmit its location periodically, such as every hour of operation or after a predetermined distance. Wireless transmitter 145 may also allow a request for vehicle information to be received at the vehicle 140. Interfacing with a vehicle's onboard diagnostic system 170 may allow various information to be gathered on vehicle 140, such as information concerning how far vehicle 140 has traveled over a period of time. Also, a processor 155 may be present to control and/or access any of these noted vehicle subsystems, or any other vehicle subsystems.

One or more of the subsystems onboard vehicle 140, such as wireless transmitter 145 and/or RFID device 165, may communicate with other systems via network 135. The network 135 may be a wireless network, such as a cellular telephone network or may be a network constructed especially to gather usage tax data. Network 135 may be capable of reading RFID devices installed in vehicles, such as vehicle 140. Network 135 may communicate with the payment computer system 105 and/or a jurisdiction computer system 107. The network 135 may route data between the jurisdiction computer system 107 and vehicle 140 and/or may route information between payment computer system 105 and vehicle 140.

While only one jurisdiction computer system 107 is illustrated, multiple jurisdiction computer systems may be present. For example, there may be computer systems representing various states, counties, and/or other municipalities for which usage taxes are collected. The jurisdiction computer system 107 may receive information from vehicle 140 periodically. This periodic information may identify where the vehicle is currently traveling or has previously traveled. In some embodiments, the jurisdiction computer system 107 may periodically contact vehicle 140 to determine its location. In another set of embodiments, vehicle 140 may not transmit its actual location, but rather transmit how much travel has occurred in the jurisdiction associated with jurisdiction computer system 107 within a period of time.

In some embodiments, payment computer system 105 may communicate via network 135 with vehicle 140. Again here, information may be transmitted between the vehicle 140 and the payment computer system 105. Periodically, the vehicle 140 may transmit location information to payment computer system 105. Such information may be in the form of the vehicle's actual location (e.g., GPS coordinates), or information on how much distance has been traveled in a jurisdiction, or within a time period. As opposed to information on how much distance as been traveled, the vehicle may transmit information on how much time has been spent in a particular jurisdiction, what roads have been used in the jurisdiction, and/or at what time those roads were used. In some embodiments, the vehicle 140 will store such travel information about the vehicle's travel on a computer-readable storage device information on the vehicles travel. Such stored information may be transmitted periodically or when queried by the payment computer system 105.

Payment computer system 105 may be maintained by a financial entity that interacts with various jurisdictions and collects payments from various vehicle operators. The payment computer system 105 may also monitor where vehicles, such as vehicle 140, are operated. Payment computer system 105 may be a single computer or server and/or may be a combination of multiple computers and servers. Payment computer system 105 may interact with jurisdiction computer system 107 to receive travel information on vehicles or may receive such travel information directly from vehicles.

Payment computer system 105 may be able to interact with stored value accounts, such as stored value account 125. Payment computer system 105 may be able to deposit money into stored value account 125 and/or withdraw money from stored value account 125. While only one stored value account is illustrated, payment computer system 105 may be able to interact with multiple stored value accounts. Payment computer system 105 may also be able to access various jurisdiction payment schedules, such as jurisdiction payment schedule 130. Again here, while only one jurisdiction payment schedule is illustrated, payment computer system 105 may be able to access multiple jurisdiction payment schedules. Jurisdiction payment schedule 130 may contain information provided by a jurisdiction that identifies how various travel performed by vehicles should be taxed. Jurisdiction payment schedule 130 may be stored in a database. The database may be maintained at payment computer system 105, or may be accessible by payment computer system 105.

The jurisdiction payment schedule 130 may be used to provide a flexible taxing system. A jurisdiction may be able to greatly vary what vehicles and/or vehicle operator's are taxed and by how much. For example, a jurisdiction may wish to heavily tax vehicle operators who have been previously convicted of driving while intoxicated. Accordingly, the jurisdiction payment schedule 130 may specify that that fees for using the jurisdiction's roads are double the amount for other operators of similar vehicles. Such a jurisdiction payment schedule 130 may specify specific operators who are to be taxed the increased rate, or the payment computer system 105 may separately receive a listing of such operators and/or may access a database, possibly maintained by a law enforcement agency, containing such data.

As another example of the flexibility of jurisdiction payment schedule 130, a jurisdiction may wish to reward vehicle operators for use of vehicles that are environmentally friendly. For example, as opposed to taxing a vehicle operator an amount per mile, the jurisdiction may specify that vehicle operators receive a penny per mile for driving a fully electric vehicle. As just one more example of the many possible forms of taxation that may occur using a jurisdiction payment schedule, the amount per mile may vary depending on the day of the week and the time of day: driving during a jurisdiction's rush hours may result in increased fees being charged to the vehicle operator. This may increase the jurisdiction's collected fees and also encourage the use of public transportation.

A jurisdiction payment schedule may also specify a particular currency. For example, a jurisdiction, such as a foreign country, may specify that its fees be collected in the jurisdiction's home currency. The payment computer system 105 may convert the amount due in the jurisdiction's home currency to a vehicle operator's home currency for billing. The payment computer system 105 may then convert the amount back to the jurisdiction's home currency for payment to the jurisdiction.

Payment computer system 105 may also interact with a variety of systems that conduct communication between a vehicle operator and the payment computer system. As previously noted, a vehicle's operator may refer to the vehicle's driver, owner, or any other person or entity responsible for the vehicle. Such systems may include agent location 110, website 115, telephone operator/IVR 120, and mobile device 127 (for communication through such methods as SMS text messaging, smartphone applications, and mobile web-based access to a website). A vehicle operator may receive a notification of money being due through any of these outlets (or through some other outlet, such as a direct mailing) and/or may provide payment to the payment computer system through these outlets. Agent location 110 may be a physical location, such as a kiosk or a location manned by a clerk, where an operator may provide payment in person. Such payment may be in the form of cash provided directly into the kiosk or to the clerk. Following reception of such cash (or any other payment methods, such as credit card, debit card, gift card, etc.) the clerk or a kiosk may notify the payment computer system 105 of the amount of money that has been received. A vehicle operator may also interact with payment computer system 105 via website 115. Website 115 may allow a payment to be made in forms such as check, credit card, debit card, gift card, stored value card, bank wire, ACH withdrawal, etc.

An operator may also interact with payment computer system 105 through a telephone operator/IVR (interactive voice response) 120. A telephone operator may be a person handling telephone calls at a call center from various vehicle operators. In conjunction with, or in place of the telephone operator, an interactive voice response system may be used. Such an interactive voice response system may allow an operator to receive notifications and/or provide payment to the payment computer system 105. An operator may also interact with payment computer system 105 through a mobile device 127, which may be a mobile phone, smart phone, and/or an application residing on a smart phone. Again here, such a mobile device 127 may allow a vehicle operator to receive notifications of payments due, provide payment, and/or receive a receipt for payments provided to payment computer system 105.

As previously described, jurisdiction payment schedule 130 may contain information regarding applicable usage taxes for one or more jurisdictions. FIG. 2 is a simplified embodiment of a jurisdiction payment schedule 200 that illustrates the flexibility of the ways that jurisdictions may tax various travel. Jurisdiction payment schedule 200 may be the jurisdiction payment schedule 130 of FIG. 1, or may represent some other jurisdiction payment schedule. A jurisdiction payment schedule may include information such as a vehicle type column 205, a number of axles column 210, an amount of miles column 215, and/or an amount of money per mile column 220. The jurisdiction may have varying usage taxes based on the type of vehicle. Vehicle type column 205 may specify whether a vehicle type is personal, such as owned by an individual, or commercial, such as owned by a corporation. The number of axles column 210 may identify the number of axles a vehicle in a particular tax bracket has. An amount of miles column 215 may be used to provide different tax rates for vehicles that travel under or over a certain distance. The final column, amount of money per mile column 220, identifies the amount of money per mile due for travel conducted by a vehicle.

For example, row 225 specifies that a personal vehicle having two axles that has traveled less than 1000 miles in a month in the jurisdiction does not have to pay any taxes per mile. However, row 230 specifies that the same vehicle, a personal vehicle with two axles, that travels more than 1000 miles a month must pay five cents per mile. While only a few categories of how vehicles may be taxed are listed, those skilled in the art will recognize, that vehicles may be taxed according to many other methodologies. For example, the amount taxed per mile may vary depending on the fuel source of the vehicle (e.g., unleaded gasoline, diesel gasoline, natural gas, electricity, etc), age of the vehicle, efficiency of the vehicle (e.g., lower taxes for more efficient vehicles), etc. Further, while jurisdiction payment schedule 200 is illustrated as in the form of a spreadsheet, similar information may be stored in many other forms.

Figure 3:
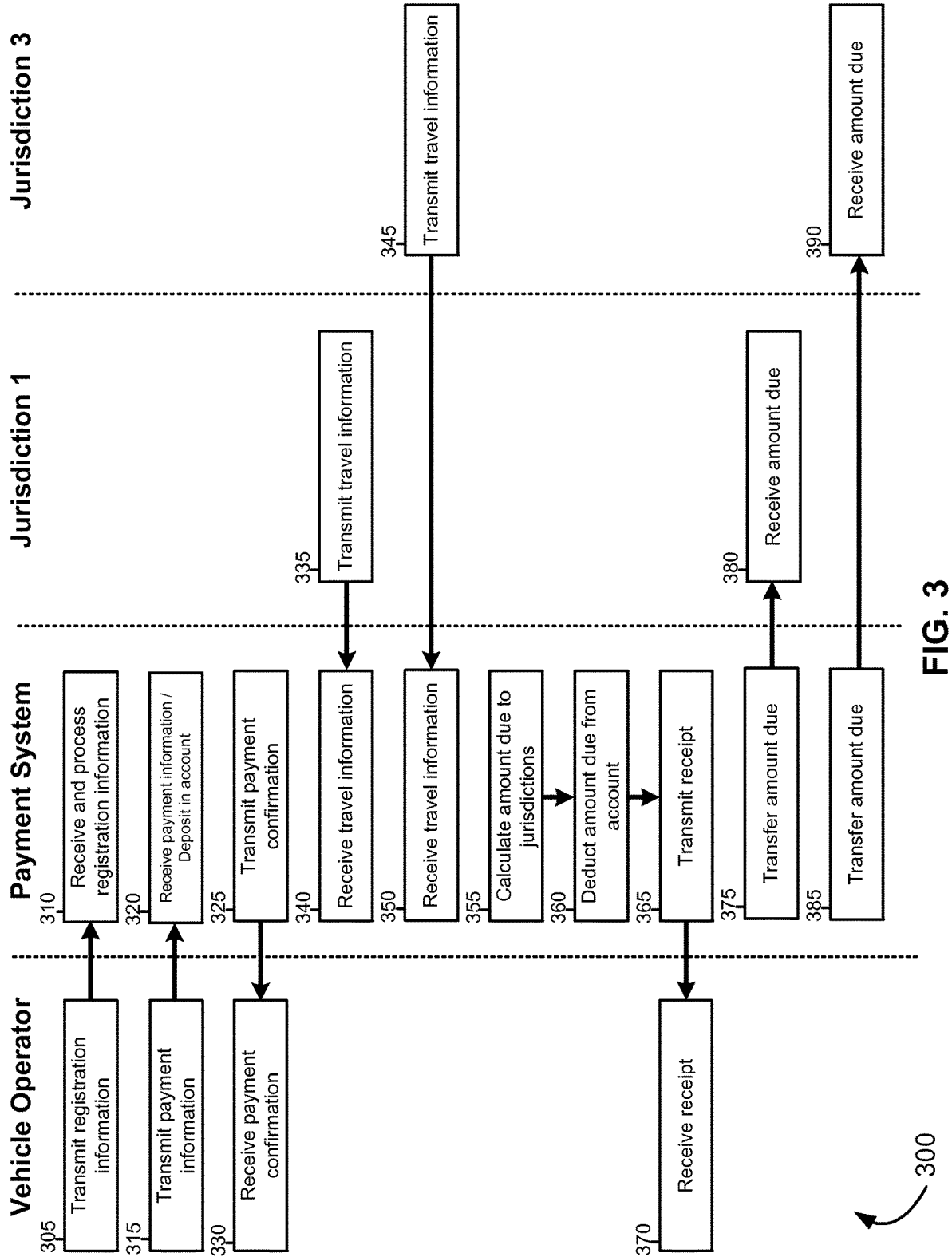
FIG. 3 is a swim diagram of an embodiment of a method for pre-payment of usage taxes.

Jurisdiction payment schedule 200 may be employed in a method, such as method 300, of receiving and distributing usage tax payments using a payment computer system. FIG. 3 is a swim diagram of a possible embodiment of a method for pre-paymentweb of usage taxes. In a pre-payment scheme, the operator deposits money in a stored value account. After the operator and/or a vehicle associated with the operator travels through a jurisdiction, money is deducted from the vehicle operator's stored value account in accordance with the usage taxes of the jurisdictions where the travel occurred.

At block 305, a vehicle operator may transmit registration information to the payment system. Such registration information may identify who the operator is, the operator's vehicle or vehicles and/or the operator's preferred method of payment. This preferred method of payment may include identifying whether the vehicle operator wishes to prepay for usage taxes or to post pay. At block 310, the payment system, which may include the payment computer system 105 of FIG. 1, may receive and process the registration information. This registration information may include the vehicle operator's preference for prepayment of usage taxes. At block 315, the operator may transmit payment information. This payment information may include the source of funds the operator is prepaying the usage taxes with, such as an account number. This payment information may also specify the type of payment the operator wishes to make, such as money order, money transfer, credit, debit, or from some other prepaid account.

The registration information of block 305 and the payment information of block 315 may be transmitted to the payment computer system 105 through any of the outlets detailed in FIG. 1. For example, the operator may provide the registration information and payment commission in person at an agent location, such as agent location 110 of FIG. 1. When a vehicle operator pays at an agent location, this may allow the operator to prepay usage taxes using cash. Alternatively, the operator may provide the registration information via a website and the payment information via a website such as website 115 of FIG. 1. Similarly, the registration information and/or the payment information may be provided via a mobile device, such as mobile device 127, or a telephone operator/IVR system, such as telephone operators/IVR system 120. At block 320, the payment information may be received at the payment system. Additionally, the amount of money associated with the payment information may be deposited into a new or pre-existing stored value account. The account the money is deposited into may be maintained by the same entity that maintains the payment system. Alternatively, the stored value account may be maintained by some other entity, such as a third-party bank.

At block 325, payment confirmation information may be transmitted to the vehicle operator. This information may be transmitted to confirm with the vehicle operator that funds have been successfully stored in the stored value account and are ready to be used for usage taxes. At block 330, the payment confirmation may be received. The payment confirmation information may be received through the same outlet that the vehicle operator sent the registration and payment information through. Alternatively, the payment confirmation information may be received through a different outlet. For example, the operator may provide the registration information and payment information through a website such as website 115 of FIG. 1, but may receive confirmation of payment through a mobile device, such as mobile device 127.

At this point, the stored value account may be ready for use. The vehicle may then travel in or through a first jurisdiction. The vehicle operator may personally be driving the vehicle, or some other person may drive the vehicle on behalf of the operator. During or after the vehicle's travel through the first jurisdiction, travel information may be transmitted from the first jurisdiction at block 335 to the payment system. Such information may be transmitted from a jurisdiction computer system, such as jurisdiction computer system 107 of FIG. 1. A jurisdiction may acquire such travel information by receiving GPS coordinates from a vehicle, reading an RFID device on a vehicle, or imaging a vehicle's license plate to name only a few examples. This travel information may be a periodic message stating that the vehicle is currently located in the first jurisdiction. In some embodiments, the travel information indicates the distance that the vehicle has traveled in the first jurisdiction. Also, in some embodiments, the jurisdiction may compile an amount of travel information for a period of time, such as a month, before transmitting it to the payment system. As opposed to transmitting raw travel information, such as the amount of time traveled in the jurisdiction or the distance traveled in the jurisdiction, the travel information may specify the amount of usage taxes due to the first jurisdiction. The travel information transmitted at block 335 from the first jurisdiction may be received by the payment system at block 340. After the travel information has been received, the payment system may wait an amount of time before deducting the amount due to the jurisdiction from the vehicle operator's stored value account. Therefore, if the first jurisdiction submits additional travel information requiring more funds to be deducted from the stored value account, the payment system may only need to debit the account once.

At block 345, a different jurisdiction, the second jurisdiction, transmits travel information to the payment system. As those with skill in the art will recognize, although only a first jurisdiction and a second jurisdiction are illustrated, any number of jurisdictions may transmit travel information to the payment system. The transmitted travel information from a second jurisdiction may be in the same format or a different format from the travel information transmitted from the first jurisdiction. For example, the first jurisdiction may transmit travel information in the form of miles traveled within the first jurisdiction. However, the second jurisdiction's travel information may be in the form of a dollar amount that the operator owes to the second jurisdiction. At block 350, the travel information may be received at the payment system from the second jurisdiction. Again, the payment system may receive travel information in one or more than one different forms from any number of jurisdictions.

After an amount of time, the travel information received at the payment system may be used to calculate an amount due to various jurisdictions at block 355. Such a calculation may occur on a predetermined basis. For example, the amount due to jurisdictions may be calculated monthly, weekly, biweekly etc. A jurisdiction may be able to specify when amounts due by vehicle operators are calculated and paid. In some embodiments, the amount due to a jurisdiction may be calculated in real-time or near real-time as travel information is received from the jurisdiction. If travel information transmitted from a jurisdiction specifies an amount due by the operator to the jurisdiction, a calculation may not be needed. In some embodiments, the payment system may add an additional fee to the amount due to a jurisdiction from the vehicle operator as payment for managing the usage tax collection system. If travel information transmitted from a jurisdiction contains information such as miles traveled in the jurisdiction, time spent in the jurisdiction, or any other information that requires analysis, the jurisdiction payment schedule, such as jurisdiction payment schedule 130 of FIG. 1, may be accessed. Additionally, other information regarding the vehicle and/or operator may be accessed to determine the amount owed by the vehicle owner to the jurisdiction. The amount due the jurisdiction may vary depending on whether the operator is an in-state or out-of-state resident, the type of vehicle, and/or the size of vehicle, to name only a few examples.

As an example only, the travel information transmitted from the first jurisdiction at block 335 may indicate that the vehicle traveled 600 miles in the first jurisdiction. At block 355, the payment system may access a jurisdiction payment schedule linked to the first jurisdiction. If necessary, the payment system may also access stored information regarding the vehicle and/or the vehicle operator. Here, the payment system may determine from the vehicle operator's registration information that the vehicle is a two-axle commercial vehicle. If the jurisdiction payment schedule 200 of FIG. 2 is the jurisdiction payment schedule of the first jurisdiction of FIG. 3, based upon the two-axle commercial vehicle traveling 600 miles, the vehicle operator would owe the first jurisdiction six dollars (0.01 dollars/mile multiplied by 600 miles=6 dollars). The calculation of the amount due to other jurisdictions may be conducted for each jurisdiction for which travel information was received.

At block 360, the amount due to one or more jurisdictions may be deducted from the stored value account of the operator. If the stored value accounts are held by a third party entity, such as a bank, the payment system may electronically contact the third party entity to debit the stored value account. The amount debited from the stored value account may be one amount to cover the fees due to multiple jurisdictions, or amounts due to each jurisdiction may be debited separately. At block 365, receipt or other notification that an amount has been debited from the stored value account may be transmitted to the vehicle operator. At block 370, the operator may receive such a notification. Such a receiver notification may be transmitted to a mobile device of the vehicle operator, the operator may be contacted via telephone, the vehicle operator may receive an e-mail or a notification in the mail. As those with skill in the art will recognize, the vehicle operator may be notified in numerous other ways.

Considerable flexibility may be present in how the vehicle operator is notified of amounts debited or to be debited from his account. For example, a summary may be provided to the vehicle operator showing the billing period, the vehicle operator's identification (e.g., name, address, identifier, etc.), and the amount due (by jurisdiction and/or in total). In some embodiments, the vehicle operator may be provided a detailed report instead of, or in addition to the summary, stating data such as: the vehicle operator's identification, the billing period, the amount due (by jurisdiction and/or in total), the amount due per day (by jurisdiction and/or in total), the total time spent on the road (by jurisdiction and/or in total), and/or the total mileage traveled (by jurisdiction and/or in total). Other categories may also be possible. Individual vehicle operators may be able to specify the information contained in the summary and/or the detailed report.

If, at block 360, the amount due to various jurisdictions is greater than the amount present in the stored value account, the vehicle operator may be notified to deposit additional funds into the stored value account. In some embodiments, the operator may be required during registration provide credit card, debit card, and/or bank account information.

This may allow the payment system to deduct additional funds from the operator when the amount present in the stored value account is insufficient to cover all usage taxes due. Further, the payment system may automatically replenish the stored value account when a threshold minimum amount of money is present in the stored value account.

At block 375, the amount due to the first jurisdiction may be transferred from the payment system. This may involve the money being transferred from the stored value account to an account held by the first jurisdiction. Alternatively, this may involve the payment system sending a check or other negotiable instrument to the first jurisdiction. Further, the amount transferred to the first jurisdiction by the payment system may be for multiple operators. As opposed to making individual transfers for each vehicle operator, the payment system may make bulk transfers that include the amount due for multiple operators to jurisdiction. Such a bulk transfer may occur on a predetermined basis, such as weekly, biweekly, monthly, or yearly, etc. In some embodiments, individual payments are transferred to a jurisdiction for each vehicle operator. At block 380, the jurisdiction may receive the amount due from the operator (along with payment for multiple other operators if the amount transferred from the payment system is a bulk transfer).

At block 385, the amount due from the vehicle operator (or the bulk transfer of amounts due from multiple vehicle operators) may be transmitted to the second jurisdiction. Such a transfer may occur at the same time as a transfer to the first jurisdiction or at some other time. For example each jurisdiction may be able to specify when it wishes to receive payments, such as the first of every month, or weekly. At block 390, the second jurisdiction may receive the amount due from the vehicle operator and/or multiple operators if the transfer is a bulk payment.

Each jurisdiction may be provided with a report on the amount of fees each is due to receive. For example, each jurisdiction may receive a summary report stating the billing period, the total amount due to the jurisdiction, and/or the total amount of payments from vehicle operators accounted for. A jurisdiction may also receive a more detailed report stating the billing period, the total amount due to the jurisdiction, and/or the total amount of payments from vehicle operators accounted for, and details of each fee due to it (e.g., miles driven by individual vehicle operators, operator name, identifier, date traveled, etc). Each jurisdiction may be able to specify the specific information it wishes to receive.

Figure 4:
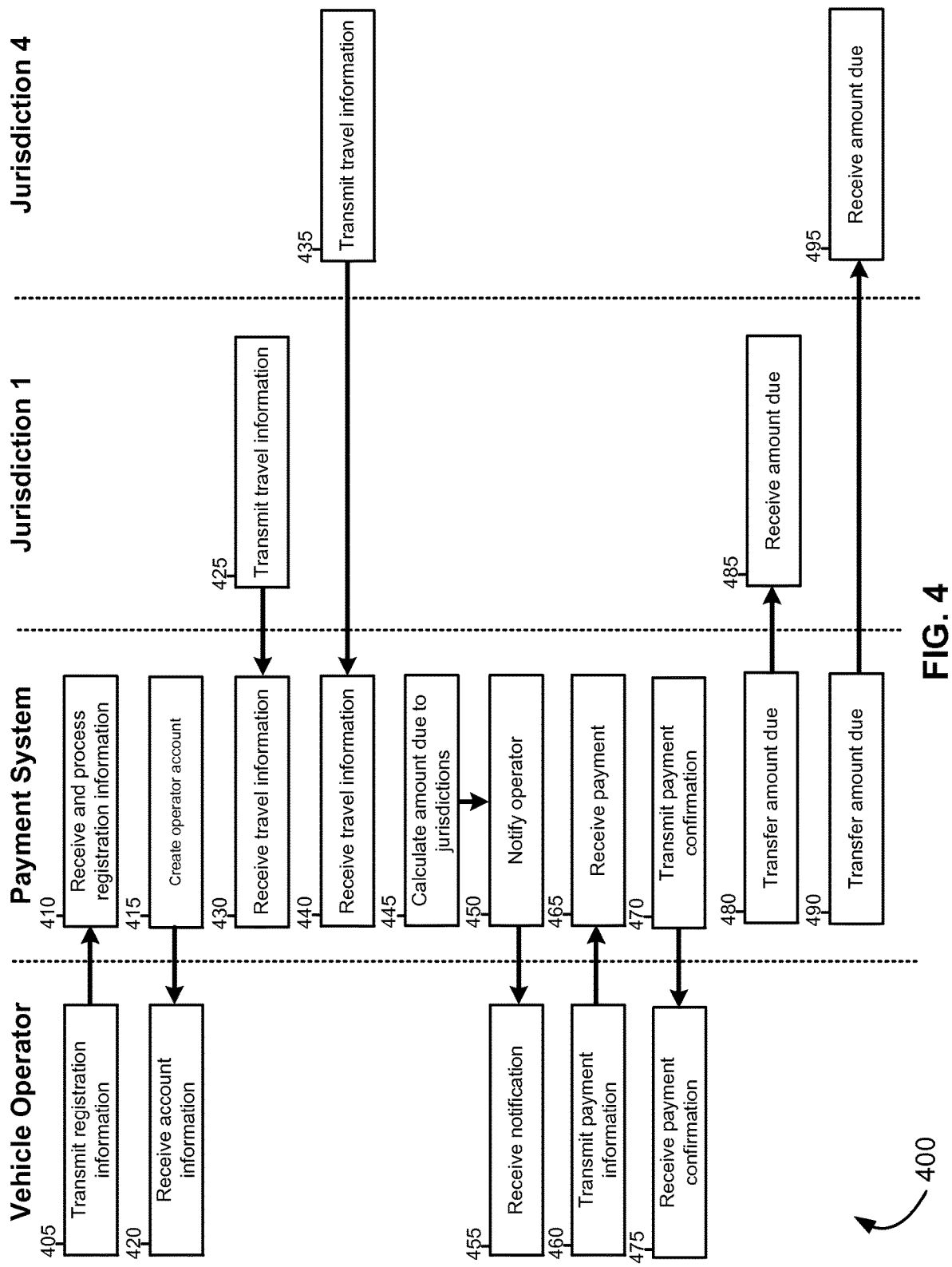
FIG. 4 is a swim diagram of an embodiment of a method for post-payment of usage taxes.

Besides a prepaid arrangement, a post pay arrangement may be possible. As previously described, a vehicle operator may be given the opportunity to select between prepay of usage taxes or post-pay usage taxes. Jurisdictions may specify that usage taxes must be either prepaid or postpaid to the payment system. FIG. 4 is a swim diagram of an embodiment of a method for post-payment of usage taxes.

At block 405, a vehicle operator may transmit registration information to the payment system. Such registration information may identify who the operator is, the operator's vehicle or vehicles and/or the operator's preferred method of payment. This preferred method of payment may include identifying that the operator wishes to post-pay for usage taxes. At block 410, the payment system, which may include the payment computer system 105 of FIG. 1, may receive and process the registration information.

At block 415, an account may be created for the operator at the payment system. Such an account may include associating a user name, account number, and/or password with the vehicle operator. The registration information provided by the vehicle operator at block 405 may be linked to the operator account at block 415 at block 420, information regarding the operator account, such as the account number, may be received by the vehicle operator. The account information may be transmitted to the operator by any means, such as e-mail, text message, telephone, etc. At blocks 425, 430, 435, and 440 travel information may be transmitted from various jurisdictions and received by the payment system. Such travel information may be similar to the travel information described in relation to blocks 335 and 345 of FIG. 3. Further, such travel information may be received and stored by the payment system similarly to the travel information described in relation to blocks 340 and 350 of FIG. 3. As previously detailed, even though only two jurisdictions are illustrated, the payment system may be capable of receiving travel information from any number of jurisdictions. At block 445, calculations similar to the calculations of block 355 of FIG. 3 may be performed.

At block 450, the notification may be sent to the vehicle operator that an amount of money is due to be paid to one or more jurisdictions. This notification may be in the form of a paper bill mailed to the vehicle operator. Alternatively, the notification may be sent in the form of an e-mail, text message, live telephone operator call, voicemail, recorded message, or any other suitable method of notification. The notification may include a breakdown of the usage taxes owed to each jurisdiction that the payment system has received travel information from. The notification sent to the vehicle operator may occur periodically. For example, the notification may be sent monthly or biweekly. At block 455, the vehicle operator may receive the notification. The method through which the vehicle operator is notified may have been previously specified by the vehicle operator during the registration process.

In response to the notification of usage taxes due, the vehicle operator may transmit payment information to the payment system at block 460. This may involve the vehicle operator mailing a check, submitting credit card, debit card, or stored value account information to the payment system. This may also involve the vehicle operator paying cash to an agent of the entity operating the payment system. For example, at an agent location, the operator may provide cash to a kiosk or a clerk along with an account number, and/or username. At block 465, the clerk or kiosk may verify the amount of cash received and credit the amount received towards the vehicle operator's amount due to one or more jurisdictions. The credit card, debit card, stored value account information may also be received at an agent location or may be received electronically (such as through a website) or telephonically (such as an IVR system) by the payment system. The vehicle operator may also stage a transaction through the website or IVR system. In a staged transaction, the vehicle operator may indicate that he will pay a bill at an agent location (possibly using cash). The vehicle operator may then receive a transaction number from the website or IVR system. At the agent location, the vehicle operator may present payment along with the transaction number to the agent. After whichever method the vehicle operator uses to pay is completed, a payment confirmation may be transmitted by the payment system at block 470 and received by the vehicle operator at block 475.

At blocks 480 and 490, the payment system may transfer the amounts due to various jurisdictions. A fee charged by the entity operating the payment system may be deducted from each amount to be transferred to the various jurisdictions as payment for managing the usage tax collection system. At blocks 485 and 495, the first jurisdiction and the second jurisdiction may receive the respective amounts due from the vehicle operator. Again, as detailed with regard to FIG. 3, the amount due transferred to the first and second jurisdiction may be part of a bulk transfer of usage taxes representing payment from multiple vehicle operators. Such bulk transfers may occur periodically, such as once a month or once a week. In some embodiments, the amount due for each vehicle operator is transferred individually to each jurisdiction.

Figure 5:
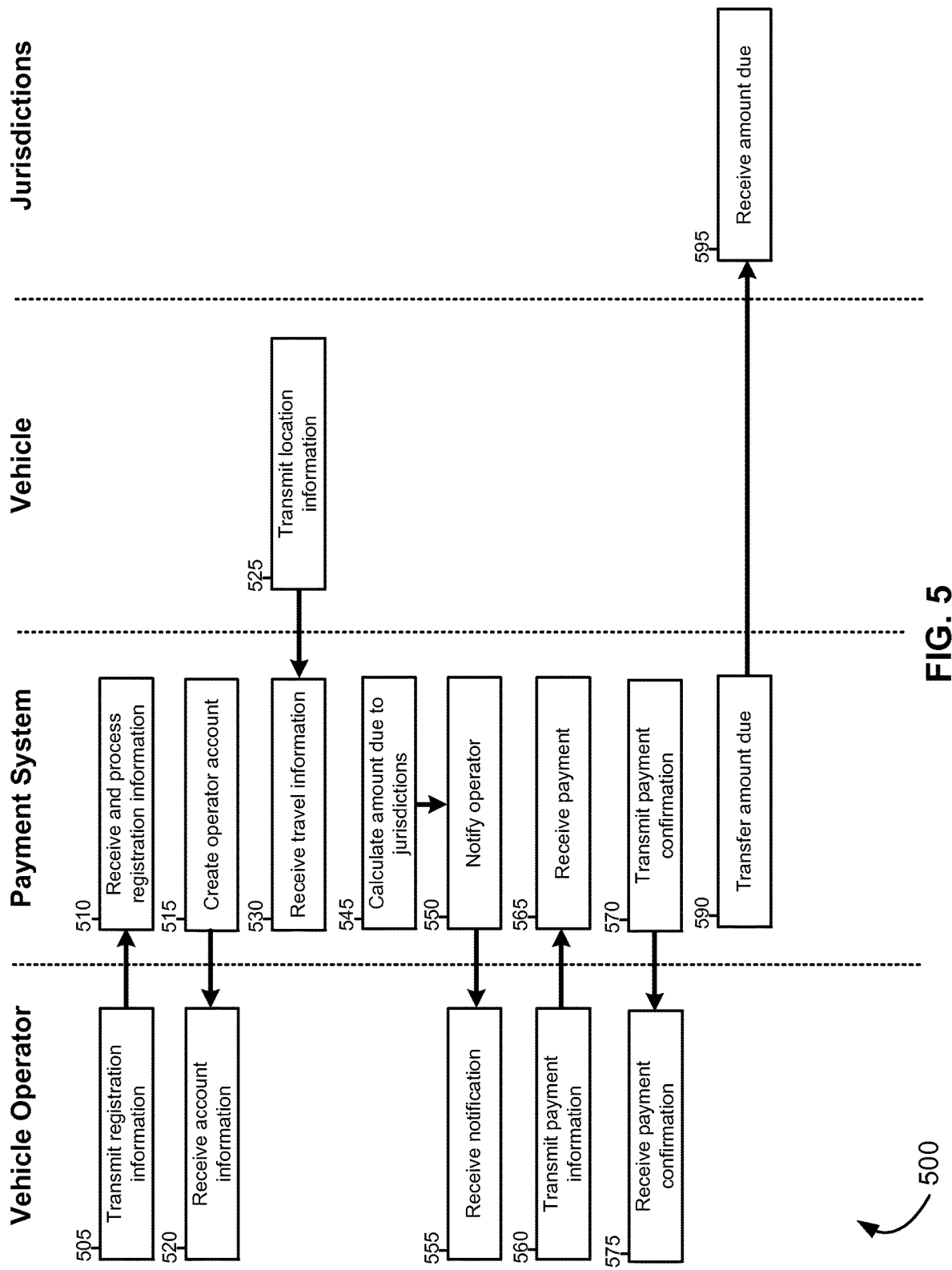
FIG. 5 is a swim diagram of another embodiment of a method for post-payment of usage taxes.

In some embodiments, rather than various jurisdictions collecting travel information from vehicles and transmitting the travel information to the payment system, the payment system may directly receive travel information from a vehicle for computation of usage taxes due to various jurisdictions. For example, the payment system may receive information via a network (such as network 135) from a vehicle systems such as GPS system 150, a wireless transmitter 145, and/or RFID device 165 illustrated as part of vehicle 140 of FIG. 1. FIG. 5 is a swim diagram of an embodiment of a method 500 for payment of usage taxes where vehicle location information is transmitted to the payment system from vehicles.

At block 505, registration information may be transmitted from the vehicle operator to payment system. This registration information may specify whether the vehicle operator prefers to post-pay or prepay usage taxes, biographical data about the vehicle operator, information about the vehicle operator's vehicle, etc. At block 510, this registration information may be received and processed by the payment system. For the remainder of method 500 it will be assumed that the operator selected post-payment of usage taxes. However, those with skill in the art will recognize that a method involving location information being transmitted from a vehicle to the payment system is not limited to only post-payment, and other forms of payment, such as pre-payment involving a stored value account may be used. As described in relation to method 400, at step 515 an account associated with the vehicle operator may be created. At block 520, account information may be received by the vehicle operator. At block 525, the vehicle may transmit location information to the payment system. Such location information may be transmitted via a wireless network, such as a cellular providers network. The vehicle may have a global navigation satellite system device (such as a GPS device) on board. This may allow the vehicle to transmit location data in the form of coordinates to the payment system. In some embodiments, the global navigation satellite system device may be used to store location information locally at the vehicle on a computer-readable storage device. Periodically, this data may be compiled on board the vehicle and transmitted to the payment system. For example, instead of frequently transmitting coordinate data to the payment system, the vehicle may only transmit information stating that the previous 100 miles of travel has occurred in a particular jurisdiction. In some embodiments, the vehicle may be programmed to regularly transmit location information, such as once per minute or hour. In still more embodiments, the vehicle may be able to determine when it crosses jurisdictional borders, and may transmit information to the payment system indicating when it has crossed into another jurisdiction, and how much travel was within the previous jurisdiction. Besides location information, a vehicle may be able to identify the person driving the vehicle, such as through an input device, such as input device 160 of FIG. 1. Based on identification provided, a different vehicle operator may be billed for the vehicle's travel.

Besides using a global navigation satellite system device, a RFID device may be used. For example, a jurisdiction may have devices in place to read RFID tags appearing on vehicles located at various locations within the jurisdiction. As those of skill in the art will recognize, RFID or a global navigation satellite system device are only two possible ways determining where a vehicle has traveled; other methods may be possible.

At block 530, travel information broadcast from the vehicle may be received by the payment system. If the travel information transmitted by the vehicle is in the form of coordinate data, the payment system may compile this data and determine where the vehicle was traveling and whether the jurisdiction the vehicle was traveling in requires the payment of usage taxes. Alternatively, if the vehicle transmits travel information indicating such things as the jurisdiction the vehicle has been traveling through and/or the distance the vehicle has traveled in the jurisdiction, the payment system may store such information for later calculation of the amount due to the jurisdiction. The payment system may not proceed to block 545 for a specified amount of time. For example, the payment system may receive travel information from the vehicle for a period of a month, or some other predetermined amount of time, before calculating the amount due to one or more jurisdictions.

At block 545, the amount due to various jurisdictions that the vehicle and/or vehicle operator has traveled through may be calculated. This calculation may be similar to the calculation performed at block 355 of FIG. 3. At block 550, the operator may be notified of usage fees being due to various jurisdictions. Such notification may be received by the vehicle operator at block 555. Similar to blocks 460 and 465 of FIG. 4, at blocks 560 and 565, payment information may be transmitted from the vehicle operator and received by the payment system. This payment information may include bank account information or credit card information. Also, cash may be paid at an agent location. At block 570, payment confirmation may be transmitted from the payment system, and received by the operator at block 575.

At block 590, the amount due to various jurisdictions may be transferred to them. As location information is transmitted from vehicles to the payment system (without the involvement of a jurisdiction computer system), the jurisdictions may not be aware of the amount owed to them in usage taxes until the usage taxes are received from the payment system. As such, the amount due transferred from the payment system to various jurisdictions may indicate the vehicle, vehicle operator, and/or amount of distance traveled within the jurisdiction. These transfers may be part of a bulk transfer conducted by the payment system to a jurisdiction on behalf of multiple operators. At block 595, various jurisdictions may receive amounts due to them in usage fees from vehicle operators.

Figure 6:
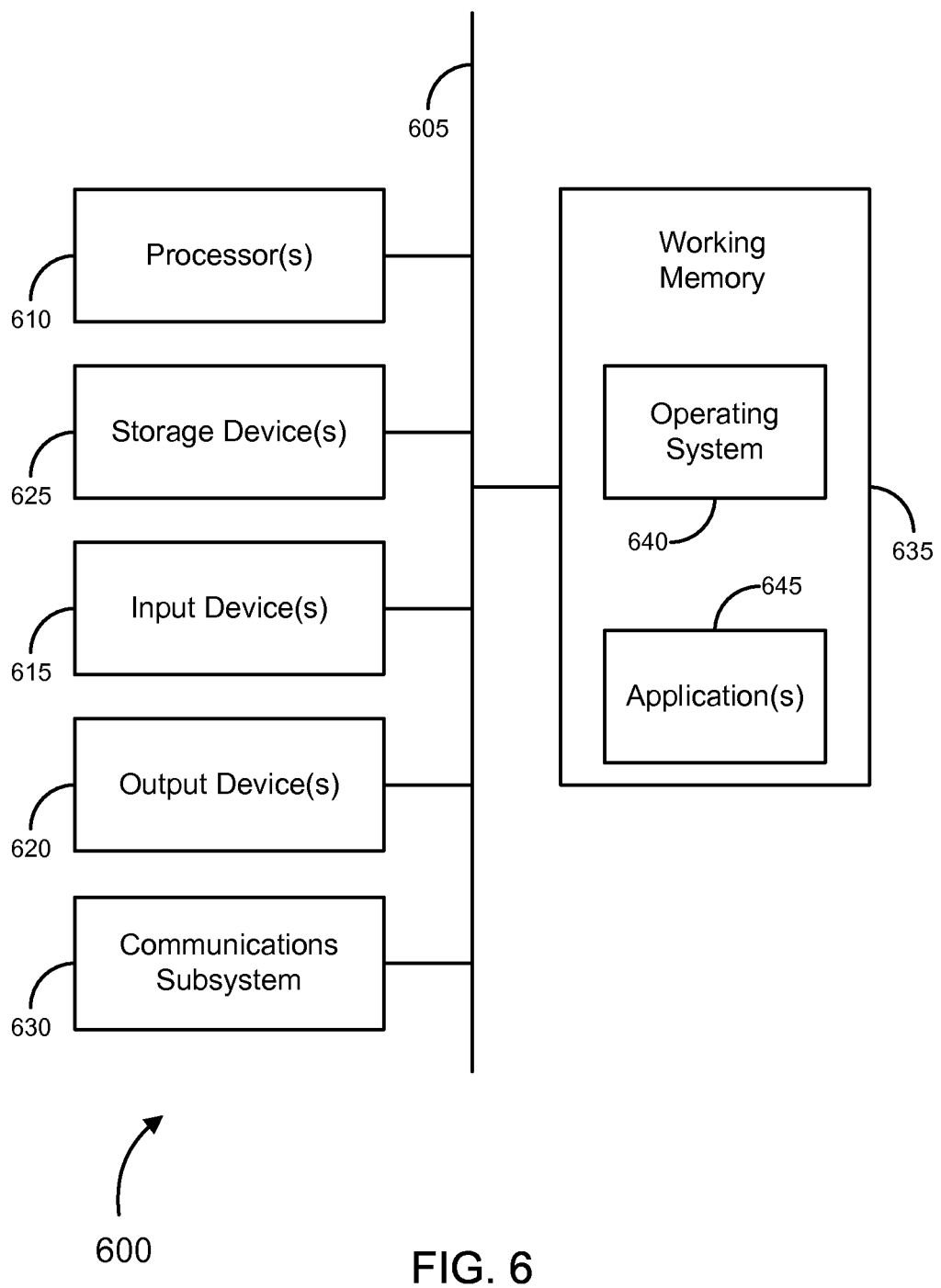
FIG. 6 is a simplified block diagram of a computer system that may serve as a payment system.

FIG. 6 provides a schematic illustration of one embodiment of a computer system 600 that can perform the methods provided by various other embodiments, as described herein, and/or can function as the payment computer system, such as payment computer system 105 in FIG. 1. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard and/or the like; and one or more output devices 620, which can include without limitation a display device, a printer and/or the like.

The computer system 600 may further include (and/or be in communication with) one or more storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infra-red communication device, a wireless communication device and/or chipset (such as an 802.11 device, a WiFi device, a WiMax device, cellular communication facilities, etc.), and/or the like. The communications subsystem 630 may permit data to be exchanged with a network (such as the network described below, to name one example), other computer systems, and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and or provided in an installation package, such that the storage medium can be used to program, configure and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein.

The terms "machine-readable medium" and "computer-readable medium," as used herein, refer to any medium that participates in providing data that causes a machine to operation in a specific fashion. In an embodiment implemented using the computer system 600, various computer-readable media might be involved in providing instructions/code to processor(s) 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical and/or magnetic disks, such as the storage device(s) 625. Volatile media includes, without limitation, dynamic memory, such as the working memory 635. Transmission media includes, without limitation, coaxial cables, copper wire and fiber optics, including the wires that comprise the bus 605, as well as the various components of the communication subsystem 630 (and/or the media by which the communications subsystem 630 provides communication with other devices). Hence, transmission media can also take the form of waves (including without limitation radio, acoustic and/or light waves, such as those generated during radio-wave and infra-red data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figures. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for collecting and allocating road use fees, comprising:

receiving, by a vehicle-based system using an input device of the vehicle, driver input identifying a first driver as the driver of a vehicle in a first jurisdiction;

periodically determining a current position of the vehicle using a global navigation satellite system of the vehicle;

determining, by the vehicle-based system, using the global navigation satellite system of the vehicle, when the vehicle has crossed a jurisdictional border exiting the first jurisdiction;

in response to the determination that the vehicle has exited the first jurisdiction:
(a) determining, by the vehicle-based system, a first distance that the vehicle has traveled within the first jurisdiction;
(b) identifying a first jurisdiction computer system associated with the first jurisdiction; and
(c) transmitting, by the vehicle-based system, first data including the first distance that the vehicle has traveled within the first jurisdiction and the identity of the first driver of the vehicle in the first jurisdiction, to the first jurisdiction computer system associated with the first jurisdiction;

receiving, at the first jurisdiction computer system associated with the first jurisdiction, the first data transmitted from the vehicle indicating the first distance the vehicle has traveled within the first jurisdiction and the identity of the first driver of the vehicle in the first jurisdiction;

calculating, by the first jurisdiction computer system, a first road use fee due to the first jurisdiction based on the identity of the first driver of the vehicle and a first road use fee schedule associated with the first jurisdiction;

receiving, by the vehicle-based system using the input device of the vehicle, driver input identifying a second driver as the driver of the vehicle in a second jurisdiction;

determining, by the vehicle-based system, using the global navigation satellite system of the vehicle, when the vehicle has crossed a jurisdictional border exiting the second jurisdiction;

in response to the determination that the vehicle has exited the second jurisdiction:
(a) determining, by the vehicle-based system, a second distance that the vehicle has traveled within the second jurisdiction;
(b) identifying a second jurisdiction computer system associated with the second jurisdiction, wherein the second jurisdiction computer system is different from the first jurisdiction computer system; and
(c) transmitting, by the vehicle-based system, second data including the second distance that the vehicle has traveled within the second jurisdiction and the identity of the second driver of the vehicle in the second jurisdiction, to the second jurisdiction computer system associated with the second jurisdiction;

receiving, at the second jurisdiction computer system associated with the second jurisdiction, the second data transmitted from the vehicle indicating the second distance the vehicle has traveled within the second jurisdiction and the identity of the second driver of the vehicle in the second jurisdiction;

calculating, by the second jurisdiction computer system, a second road use fee due to the second jurisdiction based on the identity of the second driver of the vehicle and a second road use fee schedule associated with the second jurisdiction;

periodically transmitting, by the vehicle-based system, where the vehicle has traveled to a payment computer system, but wherein the vehicle-based system is configured not to transmit actual location data corresponding to the vehicle to the first jurisdiction or the second jurisdiction computer system;

receiving, at the payment computer system, an indication of the first road use fee from the first jurisdiction computer system and an indication of the second road use fee from the second jurisdiction computer system;

deducting, by the payment computer system, from a stored value account associated with at least one of the vehicle, the first driver, or the second driver, at least the first road use fee and the second road use fee; and transferring, by the payment computer system, the first road use fee to the first jurisdiction and the second road use fee to the second jurisdiction.

2. The method of claim 1, further comprising:
providing, by the payment computer system, a party associated with the stored value account with an option for funding the stored value account or receiving a bill for road use after travel by the vehicle has occurred, wherein the option is provided before funds are allocated to the stored value account.

3. The method of claim 1, wherein the fees due to at least one of the first jurisdiction or the second jurisdiction are respectively based on a criminal record of the first driver and the second driver.

4. The method of claim 1, wherein a timing of periodically transmitting the data indicating where the vehicle has traveled to the payment computer system is based on an increment of distance traveled.

5. The method of claim 1, wherein transferring the first road use fee or the second road use fee comprises transferring an indication of a party associated with the stored value account or the vehicle.

6. The method of claim 1, wherein a road use fee transferred to at least one of the first jurisdiction or the second jurisdiction is part of a periodic bulk payment to a jurisdiction of road use fees for multiple parties.

7. The method of claim 1, wherein the stored value account is linked to at least one of the first driver or the second driver.

8. The method of claim 1, wherein the stored value account is linked to the vehicle.

9. The method of claim 1, wherein the first road use fee schedule is based on a number of axles.

10. The method of claim 1, wherein the first road use fee schedule is based on a vehicle type.

11. The method of claim 1, further comprising:
determining a first mobile device associated with the first driver of the vehicle within the first jurisdiction;
in response to determining that the vehicle has exited the first jurisdiction, transmitting first road use fee data to the first mobile device associated with the first driver;
determining a second mobile device associated with the second driver of the vehicle within the second jurisdiction; and in response to determining that the vehicle has exited the second jurisdiction, transmitting second road use fee data to the second mobile device associated with the second driver.

12. A system for collecting and allocating road use fees, the system comprising:
a vehicle-based system comprising:
an input device;
a global navigation satellite system;
a vehicle;
a processing unit; and
a computer readable medium having stored thereon instructions that, when executed by the processing unit, cause the vehicle-based system to:
receive, via the input device, driver input identifying a first driver as the driver of the vehicle in a first jurisdiction;
periodically determine a current position of the vehicle using the global navigation satellite system of the vehicle;
determining, using the global navigation satellite system, when the vehicle has crossed a jurisdictional border exiting the first jurisdiction;
in response to determining that the vehicle has exited the first jurisdiction:
(a) determining a first distance that the vehicle has traveled within the first jurisdiction;
(b) identifying a first jurisdiction computer system associated with the first jurisdiction; and
(c) transmitting first data including the first distance that the vehicle has traveled within the first jurisdiction and the identity of the first driver of the vehicle in the first jurisdiction, to the first jurisdiction computer system associated with the first jurisdiction;
receiving, via the input device, driver input identifying a second driver as the driver of the vehicle in a second jurisdiction;
determining, using the global navigation satellite system, when the vehicle has crossed a jurisdictional border exiting the second jurisdiction; and
in response to determining that the vehicle has exited the second jurisdiction:
(a) determining a second distance that the vehicle has traveled within the second jurisdiction;
(b) identifying a second jurisdiction computer system associated with the second jurisdiction; and
(c) transmitting second data including the second distance that the vehicle has traveled within the second jurisdiction and the identity of the second driver of the vehicle in the second jurisdiction, to the a second jurisdiction computer system associated with the second jurisdiction; and
periodically transmitting where the vehicle has traveled to a payment computer system, but wherein the vehicle-based system is configured not to transmit actual location data corresponding to the vehicle to the first jurisdiction or the second jurisdiction computer system;
a first jurisdiction computer system associated with a first jurisdiction, the first jurisdiction computer system comprising:
a communication interface configured to enable the first jurisdiction computer system to interface with one or more vehicles;
a processor; and a computer readable medium having stored thereon instructions that, when executed by the processing unit, cause the first jurisdiction computer system to:
receive the first data transmitted from the vehicle indicating the first distance the vehicle has traveled within the first jurisdiction and the identity of the first driver of the vehicle in the first jurisdiction; and
calculate a first road use fee due to the first jurisdiction based on the identity of the first driver of the vehicle and a first road use fee schedule associated with the first jurisdiction;
a second jurisdiction computer system associated with a second jurisdiction, the second jurisdiction computer system comprising:
a communication interface configured to enable the second jurisdiction computer system to interface with one or more vehicles;
a processor; and
a computer readable medium having stored thereon instructions that, when executed by the processing unit, cause the second jurisdiction computer system to:
receive the second data transmitted from the vehicle indicating the second distance the vehicle has traveled within the second jurisdiction and the identity of the second driver of the vehicle in the second jurisdiction; and
calculate a second road use fee due to the second jurisdiction based on the identity of the second driver of the vehicle and a second road use fee schedule associated with the second jurisdiction; and
a payment computer system comprising:
a communication interface configured to enable the second jurisdiction computer system to interface with one or more jurisdiction computer systems;
a processor; and
a computer readable medium having stored thereon instructions that, when executed by the processing unit, cause the payment computer system to:
receive an indication that funds have been received from a party, wherein the party is responsible for operation of the vehicle;
receive a stored value account identifier from the party;
allocate at least a portion of the received funds to a stored value account linked to the stored value account identifier;
deduct from the stored value account associated with the party, at least the first road use fee and the second road use fee; and
transfer the first road use fee to the first jurisdiction and the second road use fee to the second jurisdiction.

13. The system for collecting and allocating road use fees of claim 12, wherein the vehicle-based system is further configured to:
in response to determining that the vehicle has exited the first jurisdiction, determining a first amount of time that the vehicle spent in the first jurisdiction;
transmit the first amount of time that the vehicle spent in the first jurisdiction to the first jurisdiction computer system;
in response to determining that the vehicle has exited the second jurisdiction, determining a second amount of time that the vehicle spent in the second jurisdiction; and
transmit the second amount of time that the vehicle spent in the second jurisdiction to the second jurisdiction computer system.

14. The system for collecting and allocating road use fees of claim 12, wherein the first road use fee schedule further specifies different road use fees associated with different times of day for driving within the first jurisdiction, and wherein the second road use fee schedule further specifies different road use fees associated with different times of day for driving within the second jurisdiction.

15. The system for collecting and allocating road use fees of claim 12, wherein the vehicle-based system is further configured to:
determine a first mobile device associated with the first driver of the vehicle within the first jurisdiction;
transmit first road use fee data to the first mobile device associated with the first driver, in response to determining that the vehicle has exited the first jurisdiction;
determine a second mobile device associated with the second driver of the vehicle within the second jurisdiction; and
transmit second road use fee data to the second mobile device associated with the second driver, in response to determining that the vehicle has exited the second jurisdiction.

16. The method of claim 1, wherein:
prior to the determination that the vehicle has exited the first jurisdiction, the vehicle-based system:
receives, from the first jurisdiction computer system, periodic requests to determine to location of the vehicle within the first jurisdiction; and
responds to the periodic requests from the first jurisdiction computer system to confirm the location of the vehicle within the first jurisdiction; and
prior to the determination that the vehicle has exited the second jurisdiction, the vehicle-based system:
receives, from the second jurisdiction computer system, periodic requests to determine to location of the vehicle within the second jurisdiction; and
responds to the periodic requests from the second jurisdiction computer system to confirm the location of the vehicle within the second jurisdiction.

17. The method of claim 1, wherein each of the first jurisdiction computer system and the second jurisdiction computer system are configured to calculate road usage fees due to a physical jurisdiction separately based on a plurality of jurisdiction-specific road usage rate factors, including:
(a) the distance that the vehicle was driven within the physical jurisdiction;
(b) the time that the vehicle was within the physical jurisdiction;
(c) a number of axles of the vehicle;
(d) the type of the vehicle;
(e) the fuel source of the vehicle; and
(f) a criminal record of a driver the vehicle within the physical jurisdiction.

18. A system for collecting and allocating road usage data, the system comprising:
a vehicle-based system comprising:
an input device;
a vehicle;
a global navigation satellite system;
a processing unit; and a computer readable medium having stored thereon instructions that, when executed by the processing unit, cause the vehicle-based system to:
receive, via the input device, driver input identifying a first driver as the driver of the vehicle in a first jurisdiction;
determine, using the global navigation satellite system, when the vehicle has crossed a jurisdictional border exiting the first jurisdiction;
determine a first distance that the vehicle has traveled within the first jurisdiction, in response to the determination that the vehicle has exited the first jurisdiction;
identify a first jurisdiction computer system configured to receive data from the vehicle-based system via a cellular network, wherein the first jurisdiction computer system is associated with the first jurisdiction and configured to receive data relating to travel by the vehicle within the first jurisdiction;
transmit first data including the first distance that the vehicle has traveled within the first jurisdiction and the identity of the first driver of the vehicle in the first jurisdiction to the first jurisdiction computer system;
receive, via the input device, driver input identifying a second driver as the driver of the vehicle in a second jurisdiction;
determine, using the global navigation satellite system, when the vehicle has crossed a jurisdictional border exiting the second jurisdiction;
determine a second distance that the vehicle has traveled within the second jurisdiction, in response to the determination that the vehicle has exited the second jurisdiction;
identify a second jurisdiction computer system, the second jurisdiction computer system different from the first jurisdiction computer system, wherein the second jurisdiction computer system is associated with the second jurisdiction and configured to receive data relating to travel by the vehicle within the second jurisdiction;
transmit second data including the second distance that the vehicle has traveled within the second jurisdiction and the identity of the second driver of the vehicle in the second jurisdiction, to the second jurisdiction computer system;
a plurality of jurisdiction computer systems, including at least the first jurisdiction computer system and the second jurisdiction computer system, each of the plurality of jurisdiction computer systems associated with a corresponding physical jurisdiction, and each jurisdiction computer systems comprising:
a communication interface configured to enable the jurisdiction computer system to interface with one or more vehicles;
a processor; and
a computer readable medium having stored thereon instructions that, when executed by the processing unit, cause the jurisdiction computer system to:
receive data transmissions from a plurality of mobile systems associated with particular vehicles, including the vehicle-based system, said data transmissions including data indicating a distance that the particular vehicle has traveled within the physical jurisdiction corresponding to the jurisdiction computer system, and data identifying a driver the particular vehicle within the physical jurisdiction corresponding to the jurisdiction computer system;
retrieve a road usage fee schedule associated with the physical jurisdiction corresponding to the jurisdiction computer system;
calculate a road usage fee due to the physical jurisdiction based on the identity of the second driver of the vehicle and a second road use fee schedule associated with the second jurisdiction; and
transmit data including the calculated road usage fees due to the physical jurisdiction, to a payment computer system,
wherein each of the plurality of jurisdiction computer systems is configured to calculate the road usage fees due to a physical jurisdiction separately based on a plurality of jurisdiction-specific road usage rate factors, including:
(a) a distance that the vehicle was driven within the physical jurisdiction;
(b) a time that the vehicle was within the physical jurisdiction;
(c) a number of axles of the vehicle;
(d) a type of the vehicle;
(e) a fuel source of the vehicle; and
(f) a criminal record of a driver the vehicle within the physical jurisdiction;
a payment computer system comprising:
a communication interface configured to enable the payment computer system to interface with the plurality of jurisdiction computer systems;
a processor; and
a computer readable medium having stored thereon instructions that, when executed by the processing unit, cause the payment computer system to:
receive data transmissions from the plurality of jurisdiction computer systems, including the first jurisdiction computer system and the second jurisdiction computer system, each data transmission including data identifying a calculated road usage fee due to a physical jurisdiction, data identifying a vehicle, and data identifying a vehicle operator associated with the calculated road usage fee;
determine a stored value account associated with the vehicle identifier;
determine whether the amount in the stored value account is sufficient to cover the calculated road usage fee;
in response to determining that the amount in the stored value account is insufficient to cover the calculated road usage fee:
(a) deduct the calculated road usage fee from the determined stored value account associated with the vehicle identifier; and
(b) transmit the road usage fees deducted from the stored value account to the corresponding jurisdiction computer system; and
in response to determining that the amount in the stored value account is insufficient to cover the calculated road usage fee:
(a) determine payment account information associated with the vehicle operator;
(b) determine a mobile device associated with the vehicle operator;
(c) transmit a notification of payment due to the mobile device associated with the vehicle operator;

(d) receive a payment confirmation from the mobile device associated with the vehicle operator;
(e) in response to receiving the payment confirmation from the mobile device associated with the vehicle operator, process payment of the calculated road usage fee from the determined payment account information associated with the vehicle operator;
(f) transmit a payment receipt to the mobile device associated with the vehicle operator; and
(g) transmit the road usage fees processed via the payment account information associated with the vehicle operator, to the corresponding jurisdiction computer system;

one or more mobile devices, each comprising:
  a display screen;
  an input device;
  a processor; and
  a computer readable medium having stored thereon instructions that, when executed by the processing unit, cause the mobile device to:
    receive a notification of payment due for a calculated road usage fee, from the payment computer system;
    output, via the display screen, a user interface indicating the notification of payment due for the calculated road usage fee;
    receive, via the input device, a payment confirmation from a user;
    transmit data corresponding to the payment confirmation to the payment computer system;
    receive a payment receipt from the payment computer system; and
    output the payment receipt via the display screen,
  wherein the vehicle-based system is further configured to:
periodically determine a current position of the vehicle using the global navigation satellite system of the vehicle; and
periodically transmit data indicating where the vehicle has traveled to the payment computer system,
wherein the vehicle-based system is configured not to transmit actual location data corresponding to the vehicle to any of the plurality of jurisdiction computer systems, including the first jurisdiction computer system or the second jurisdiction computer system.

* * * * *